Sept. 28, 1926.

D. M. WEIGEL 1,601,092

HOSE AND MEANS OF MANUFACTURING SAME

Original Filed Oct. 21, 1920

Daniel Michel Weigel

INVENTOR

Patented Sept. 28, 1926.

1,601,092

UNITED STATES PATENT OFFICE.

DANIEL MICHEL WEIGEL, OF TRENTON, NEW JERSEY.

HOSE AND MEANS OF MANUFACTURING SAME.

Application filed October 21, 1920, Serial No. 418,364. Renewed November 28, 1924.

My invention relates to hose for the conveyance of water steam, grain and all other matters. It is equally useful as a suction or delivery pipe. My object is to construct, by simple means, a very strong and very flexible hose.

As made at present, hose is primarily made of cotton duck and is sometimes cased with rubber. There is also flexible metal hose, the joints being made of rubber.

Amongst other objects I obtain a hose made partially of metal and partially of rubber. It has the strength of the flexible metal hose and the flexibility of a rubber hose. It is very easy of construction.

My invention consists of metal twisted wire strands or braided wire, or cords of wire strands and similar material embedded in rubber.

There are two or more layers of twisted wire strands and rubber. Each ply or layer is so laid that the wire strands or similar material run at an inclined plane or bias to the longitude of the hose, and so that such bias is at about an angle of forty-five degrees (45°) and so that one ply runs in the opposite direction to the other, thereby crossing each other at approximately right angles. The wire in each ply is separated by rubber and the rubber encircles the strand of wire: thus, not only is the wire separated in each ply, but each ply or layer is separated by rubber also.

The means of construction which I have invented is also an easy way of making it. If a wire were wrapped around a mandrel or cylinder on a bias or angle of approximately forty-five degrees (45°) it is obvious that there would be a great space (and in ratio to the diameter of the hose)—between each lap of the wire. In Figure 1 I show what would occur.

It is impossible to wrap the wire closely together at an angle of approximately 45°, on a plain mandrel. To attempt it is a mechanical failure.

My method of construction is very simple and permits of the wire strands being evenly and uniformly wrapped around a mandrel and further permits of these being wrapped very closely together with an intervention of rubber between each lap of the wire strands and a covering of rubber top and bottom: as I will hereby explain:—

Figure 3:
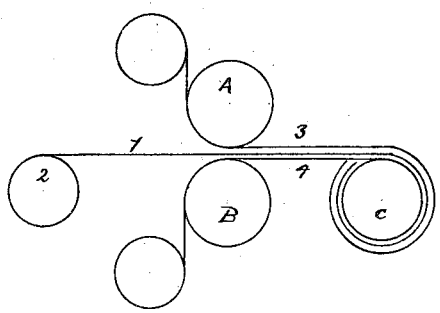
Fig. 3 shows a diagram of the method of making the sheets of rubber and wire.
Figure 1:
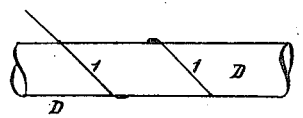
Figure 2:
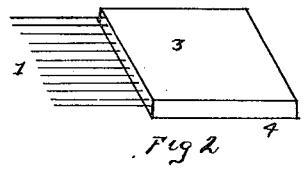
Fig. 2 shows a sheet of rubber with twisted wire strands, braided wire, plain wire, or similar material embedded in it. The wires running parallel to each other and parallel with the longitudinal edge of the rubber.
Figure 4:
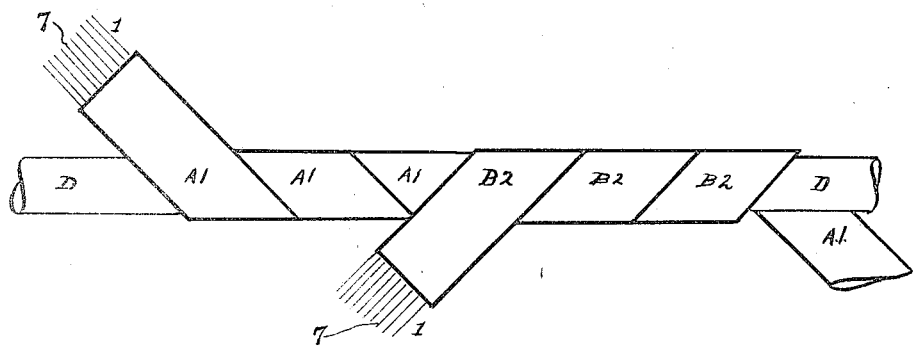

Fig. 4 shows a diagram of how the rubber and wire sheets are wrapped upon a mandrel or cylinder, forming a hose, with the wires running at an angle of approximately 45°. Each wire separated by rubber. It shows a second ply running in the opposite direction. The method I employ is this: Twisted wire strands or similar material "1" (Fig. 3) are passed between rollers A—B. The said wires, which are run off several drums "2" are kept at the necessary required distances apart by any means. Two sheets of rubber, 3—4 also pass between the rollers. These sheets are firmly pressed together locking the wires in place, and each wire being separated by the rubber which is forced between them, and which fills the spaces. The combined wire and rubber sheet is taken off on drum C ready for use.

Another way might be to wrap the wire with rubber first, and then join them altogether by the rubber adhering, but the means I show is the preferable method.

Sheets of any width and any length of wire and rubber may be made and the necessary width to make each diameter hose may be cut off such sheet.

Fig. 4 shows how the hose is constructed of this sheet. It is practically the wrapping of an inclined plane around a revolving mandrel pipe or similar cylinder. Subject to the diameter of the mandrel, a strip of wire and rubber sheet is cut to width so that when such strip is wrapped around the revolving mandrel the edges of the strip meet and join at each lap. It is merely a question of correct width, which is easy of calculation. By this means I obtain an easy and speedy way of wrapping my wires at an angle of 45° or thereabout and obtain a uniformed distance between my wires which I also thus am able to place close together.

"D" is the mandrel or cylinder, which is made to revolve by any desired means, and $A^1$ is the inner ply of rubber and wire sheet wrapped at approximately 45° to the mandrel: and $B^2$ is the outer ply or rubber and wire sheet wrapped in the opposite direction. At the end of each sheet, $A^1$ and $B^2$, I show loose wires "7" as an indication that these sheets contain wire.

Any number of plies can be wrapped one upon the other and any size strands and any thickness of rubber can be employed.

The whole is then finally wrapped with canvas or a similar material ready for vulcanizing: after which such canvas is removed.

It is preferable to make the hose entirely of twisted wire strands and rubber, but canvas may be intersected if desired, or an inner liner of canvas.

Having fully explained my invention I claim:—

1. In a hose having the main body portion thereof comprised solely of rubber and stranded twisted wire elements, said body portion comprising in combination a plurality of plies of wires embedded in rubber, each ply of wire running in approximately the opposite direction to an adjacent ply and the individual wires extending at substantially forty-five degrees to the longitudinal axis of the hose, each of said plies of wire being separated from other plies by rubber and the individual wires of each ply being also separated from each other by rubber whereby said wires are prevented from touching each other and whereby the same are solely in contact with the rubber of the body portion, the said hose being vulcanized as a whole.

2. A rubber hose consisting entirely of wire and rubber and comprising a plurality of layers of strips vulcanized together, the strips of one layer extending oppositely to those of the other layer and at substantially forty-five degrees to the longitudinal axis of the completed hose, each strip comprising a plurality of stranded twisted wires disposed side by side, rubber embedding said wires on all sides and completely separating the same from each other and from the wires of the superimposed strips, said individual wires being entirely independent of the next adjacent wires substantially as described.

3. In a hose having the main body portion thereof comprised solely of rubber and stranded twisted wire elements, said body portion comprising in combination, a plurality of plies of wires embedded in rubber, the individual wires of one ply running in a direction transverse to the wires of another ply, each of said plies of wire being separated from other plies by rubber and the individual wires of each ply being also separated from each other by the rubber whereby said wires are prevented from touching each other and whereby the same are solely in contact with the rubber of the body portion, the said hose being vulcanized as a whole.

4. A rubber hose consisting entirely of wire and rubber and comprising a plurality of layers of strips vulcanized together, the strips of one layer extending transversely relative to the strips of another layer, each strip comprising a plurality of stranded twisted wires disposed side by side, rubber embedding said wires on all sides and completely separating the same from each other and from the wires of the superimposed strips, said individual wires being entirely independent of the next adjacent wires substantially as described.

In testimony whereof I hereto affix my signature.

DANIEL MICHEL WEIGEL.